United States Patent [19]
LaRue et al.

[11] Patent Number: 5,090,937
[45] Date of Patent: Feb. 25, 1992

[54] DIAPHRAGM GAME CALLER WITH CONICAL INNER MOUNT

[76] Inventors: Barney LaRue, P.O. Box 104, Rudy, Ark. 72952; Zolan Jetton, 2806 Kendall Ave., Fort Smith, Ark. 72903

[21] Appl. No.: 650,237
[22] Filed: Feb. 4, 1991
[51] Int. Cl.$^5$ .............................................. A63H 5/00
[52] U.S. Cl. ................................... 446/207; 446/209
[58] Field of Search ............... 446/176, 202, 207, 208, 446/209, 213, 416

[56] References Cited

U.S. PATENT DOCUMENTS

| | | | |
|---|---|---|---|
| 637,261 | 11/1899 | Irving | 446/416 |
| 663,654 | 12/1900 | Crakow | 446/416 |
| 2,256,925 | 9/1941 | McCoy | 446/202 |
| 2,762,164 | 9/1956 | Hester | 446/416 |
| 2,969,611 | 1/1961 | Warren, Jr. | 446/202 |
| 3,722,133 | 3/1973 | Morgan | 446/202 |
| 3,811,221 | 5/1974 | Wilt | 446/202 |
| 3,815,283 | 6/1974 | Piper | 446/202 |
| 4,642,065 | 2/1987 | Whedon et al. | 446/209 |
| 4,752,270 | 6/1988 | Morton | 446/207 |
| 4,764,145 | 8/1988 | Kirby | 446/208 |
| 4,832,653 | 5/1989 | Benghash et al. | 446/416 |
| 4,950,198 | 8/1990 | Repko, Jr. | 446/207 |
| 4,976,648 | 12/1990 | Meline | 446/207 |
| 4,997,402 | 3/1991 | Blease | 446/202 |

FOREIGN PATENT DOCUMENTS

258118  9/1926  United Kingdom ................ 446/202

Primary Examiner—David N. Muir
Attorney, Agent, or Firm—Boyd D. Cox

[57] ABSTRACT

A game caller of the type utilized to attract game animals, for example, turkeys, includes telescopically interfitting tubular mouthpiece and amplifier sections. The mouthpiece section has a conically tapered portion which cooperates in frictional locking fashion with an internally conically tapered bore formed in the amplifier portion. The tubular mouthpiece has a circular end face provided with a shallow conical taper. A circular air outlet aperture is formed in an off-center manner through the end face of the mouthpiece. A latex diaphragm covers the air outlet aperture and is adjustably secured in place by an elastic rubber ring received in a circumferential groove formed in the tubular mouthpiece, adjacent the circular end face. The air outlet aperture of the mouthpiece is disposed within a hollow interior portion of the amplifier section, such that the emitted sound waves are amplified and directed to exit through an open end of the amplifier section. In use, an individual blows through an open end of the mouthpiece, disposed opposite the air outlet aperture, to produce a game attracting sound. The sound produced may be regulated by adjusting the position and tension of the latex diaphragm. To facilitate convenient transportation of the game caller for ready usage, a circumferential groove is formed around the amplifier section for securement of a carrying lanyard.

1 Claim, 2 Drawing Sheets

DIAPHRAGM GAME CALLER WITH CONICAL INNER MOUNT

BACKGROUND OF THE INVENTION

1. Field of the Invention

The present invention relates to game callers, and more particularly pertains to a diaphragm type game caller which produces a game attracting sound when blown by an individual.

2. Description of the Prior Art

Various types of game callers and wind instruments are known in the prior art. Typical examples of such game callers and wind instruments are to be found in the following patents:

| | | | |
|---|---|---|---|
| U.S. Pat. No. | 637,261 | J. Irving | Nov. 21, 1899 |
| U.S. Pat. No. | 663,654 | L. Crakow | Dec. 11, 1900 |
| U.S. Pat. No. | 2,256,925 | C. McCoy | Sept. 23, 1941 |
| U.S. Pat. No. | 2,762,164 | J. Hester | Sept. 11, 1956 |
| U.S. Pat. No. | 2,969,611 | D. Warren Jr. | Jan. 31, 1961 |
| U.S. Pat. No. | 3,722,133 | J. Morgan | Mar. 27, 1973 |
| U.S. Pat. No. | 3,811,221 | J. Wilt | May 21, 1974 |
| U.S. Pat. No. | 3,815,283 | F. Piper | June 11, 1974 |
| U.S. Pat. No. | 4,764,145 | R. Kirby | Aug. 16, 1988 |
| U.S. Pat. No. | 4,832,653 | R. Berghash et al | May 23, 1989 |
| British Pat. | 258,118 | R. Field et al | Sept. 16, 1926 |

While some of the above mentioned devices are directed to game callers, none of these devices disclose a diaphragm type game caller having telescopically inter-fitting tubular mouthpiece and amplifier portions secured by a frictional locking taper. Additionally, none of the aforesaid devices discloses the use of a rubber elastic ring in cooperation with a circumferential groove to secure a latex diaphragm over an air outlet aperture in a conically tapered end face of a game caller mouthpiece. Inasmuch as the art is relatively crowded with respect to these various types of game callers, it can be appreciated that there is a continuing need for and interest in improvements to such game callers, and in this respect, the present invention addresses this need and interest.

SUMMARY OF THE INVENTION

In view of the foregoing disadvantages inherent in the known types of game callers now present in the prior art, the present invention provides an improved game caller. As such, the general purpose of the present invention, which will be described subsequently in greater detail, is to provide a new and improved game caller which has all the advantages of the prior art game callers and none of the disadvantages.

To attain this, a representative embodiment of the concepts of the present invention is illustrated in the drawings and make use of a game caller of the type utilized to attract game animals, for example, turkeys, which includes telescopically inter-fitting tubular mouthpiece and amplifier sections. The mouthpiece section has a conically tapered portion which cooperates in frictional locking fashion with an internally conically tapered bore formed in the amplifier portion. The tubular mouthpiece has a circular end face provided with a shallow conical taper. A circular air outlet aperture is formed in an off-center manner through the end face of the mouthpiece. A latex diaphragm covers the air outlet aperture and is adjustably secured in place by an elastic rubber ring received in a circumferential groove formed in the tubular mouthpiece, adjacent the circular end face. The air outlet aperture of the mouthpiece is disposed within a hollow interior portion of the amplifier section, such that the emitted sound waves are amplified and directed to exit through an open end of the amplifier section. In use, an individual blows through an open end of the mouthpiece, disposed opposite the air outlet aperture, to produce a game attracting sound. The sound produced may be regulated by adjusting the position and tension of the latex diaphragm. To facilitate convenient transportation of the game caller for ready usage, a circumferential groove is formed around the amplifier section for securement of a carrying lanyard. An individual may place the lanyard around one's neck such that the game caller may be conveniently carried while hunting.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved game caller which has all the advantages of the prior art game callers and none of the disadvantages.

It is another object of the present invention to provide a new and improved game caller which may be easily and efficiently manufactured and marketed.

It is a further object of the present invention to provide a new and improved game caller which is of a durable and reliable construction.

An even further object of the present invention is to provide a new and improved game caller which is susceptible of a low cost of manufacture with regard to both materials and labor, and which accordingly is then susceptible of low prices of sale to the consuming public, thereby making such game callers economically available to the buying public.

Still yet another object of the present invention is to provide a new and improved game caller which provides in the apparatuses and methods of the prior art some of the advantages thereof, while simultaneously overcoming some of the disadvantages normally associated therewith.

Still another object of the present invention is to provide a new and improved game caller having tubular telescopically inter-fitting mouthpiece and amplifier sections.

Yet another object of the present invention is to provide a new and improved game caller having tubular telescopically inter-fitting mouthpiece and amplifier sections secured by a frictional locking taper.

Even still another object of the present invention is to provide a new and improved game caller which utilizes an elastic rubber ring and a circumferential groove to adjustably secure a latex diaphragm over an air outlet aperture in a conically tapered end face of a game caller mouthpiece section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
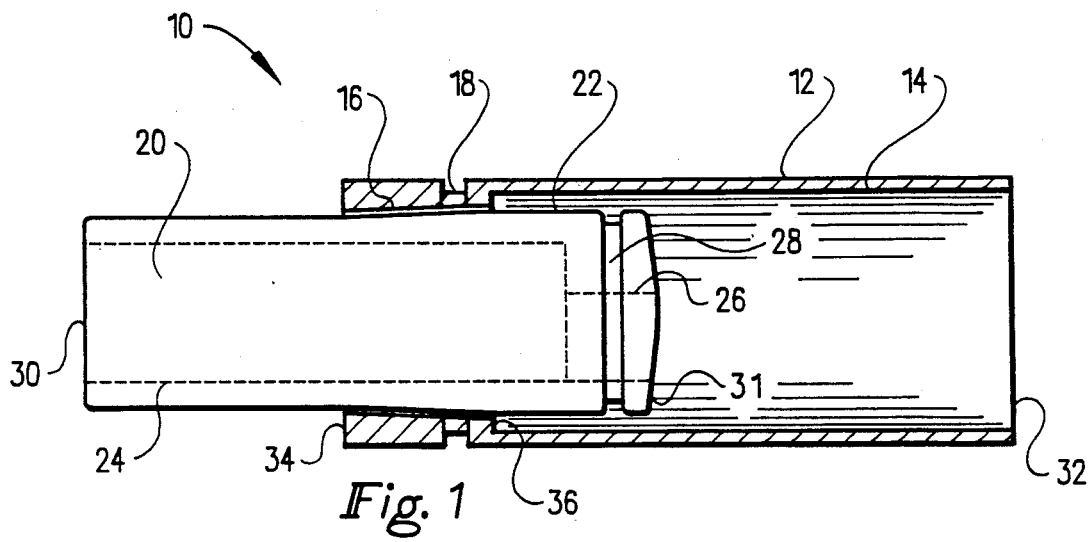
FIG. 1 is a side view, partially in cross section, illustrating the game caller according to the present invention.
Figure 2:
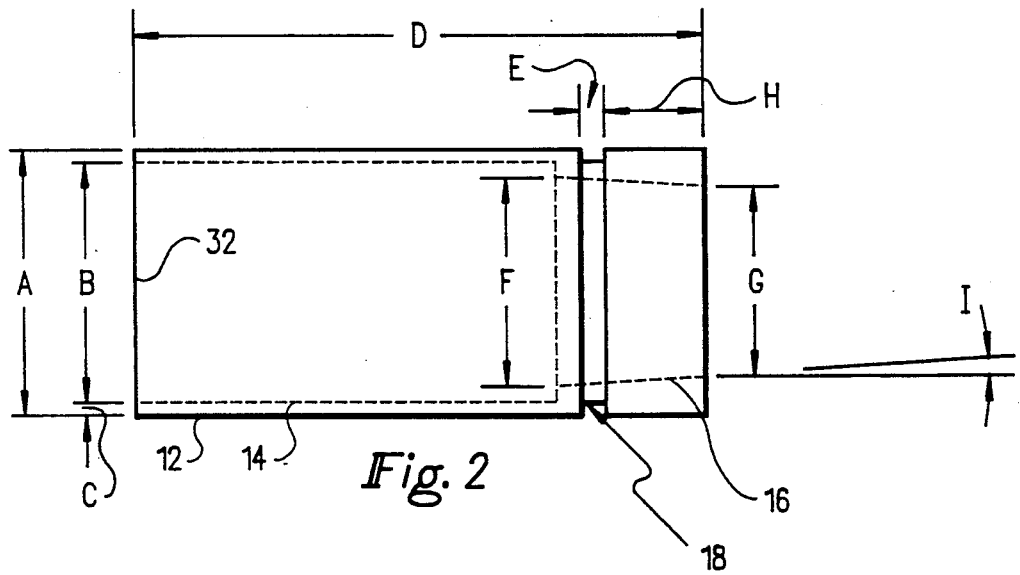
FIG. 2 is a side view illustrating the amplifier section of the game caller of the present invention.
Figure 3:
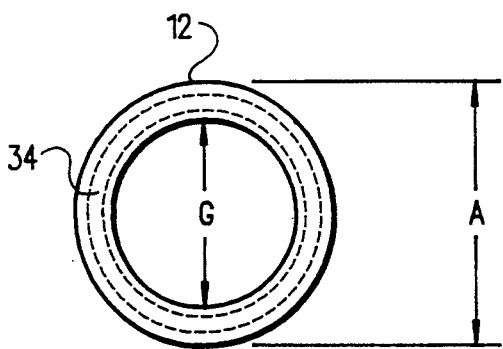
FIG. 3 is a right end view of the amplifier section illustrated in FIG. 2.
Figure 4:
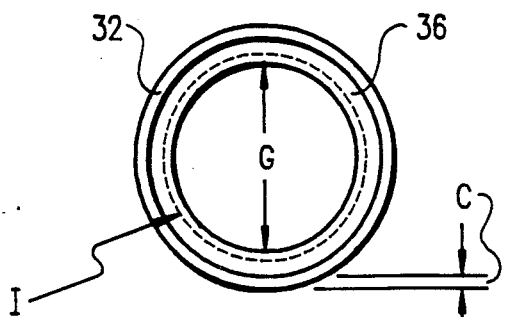
FIG. 4 is a left end view of the amplifier section illustrated in FIG. 2.

With reference now to the drawings, and in particular to FIG. 1 thereof, a new and improved game caller embodying the principles and concepts of the present invention and generally designated by the reference numeral 10 will be described.

More specifically, it will be noted that the first embodiment 10 of the invention includes a tubular amplifier section 12 having a hollow interior formed by a central longitudinal bore 14. A left end portion of the amplifier section 12 is provided with a conically tapered bore 16 which intersects the cylindrical bore 14. A circumferential groove 18 is formed around the amplifier section 12, adjacent the left end face 34. The groove 18 is adapted for securement of a cord or lanyard which may be then placed around an individual's neck to facilitate convenient transportation of the game caller, for example while hunting. The right-hand end 32 of the amplifier section 12 is open, so that sound may be emitted therethrough. The conically tapered bore portion 16 intersects the cylindrical bore portion 14, forming an internal annular shoulder 36. A mouthpiece section 20 of the game caller 10 has a left-hand end 30 which is open and which communicates with a central longitudinal bore 24 which terminates short of the closed right-hand end face 31. A sound outlet aperture 26 is formed in an off-center position in the end face 31, and intersects the longitudinal cylindrical bore 24. A circumferential groove 28 is formed around the periphery of the tubular mouthpiece section 20, adjacent the end face 31. In use, a latex diaphragm is positioned over the sound outlet aperture 26 and partially over the end face 31. An elastic rubber ring, similar to an O-ring, is then disposed partially over the latex diaphragm and within the groove 28. This securing arrangement allows the position and tension of the latex diaphragm to be readily adjusted, to regulate the sound produced. The tubular mouthpiece section 20 has a generally cylindrical exterior shape, with the exception of a conically tapered portion 22 dimensioned for frictional locking engagement within the tapered bore 16 formed in the amplifier section 12. In this manner, the mouthpiece section 20 is removably interlocked within the amplifier section 12.

With reference to FIGS. 2 through 7, the various preferred dimensions of the mouthpiece section 20 and amplifier section 12 are as listed in the following table:

| REFERENCE CHARACTER | DESCRIPTION | DIMENSION | TOLERANCE (+ or −) |
|---|---|---|---|
| AMPLIFIER SECTION DIMENSIONS | | | |
| A | Outer Dia. | 1 5/16 in. | |
| B | Inner Dia. | 1 3/16 in. | 1/32 in. |
| C | Wall thick. | 1/16 in. | 1/32 in. |
| D | Length | 2 ⅛ in. | ⅛ in. |
| E | Groove width | ⅛ in. | 1/16 in. |
| 18 | Groove depth | 1/16 in. | 1/32 in. |
| F | Large Dia. | 1 in. | |
| G | Small Dia. | 15/16 in. | 1/16 in. |
| H | Spacing | ⅛ in. | 1/16 in. |
| I | Taper angle | 3 degrees | 1 degree |
| MOUTHPIECE SECTION DIMENSIONS | | | |
| J | Outer Dia. | 29/32 in. | 1/16 in. |
| K | Inner Dia | 23/32 in. | 1/16 in. |
| L | Start taper | 1 ⅛ in. | ⅛ in. |
| M | Bore length | 2 ⅛ in. | ⅛ in. |
| N | Length | 2 ⅛ in. | ⅛ in. |
| O | Taper length | ⅛ in. | ⅛ in. |
| P | Groove width | 3/32 in. | 1/32 in. |
| Q | Spacing | 5/32 in. | 1/32 in. |
| R | Taper angle | 177 degrees | 2 degrees |
| S | Taper angle | 85 degrees | 5 degrees |
| T | Diameter | 25/64 in. | 1/16 in. |
| U | Diameter | 1 in. | 1/16 in. |

-continued

| REFERENCE CHARACTER | DESCRIPTION | DIMENSION | TOLERANCE (+ or −) |
|---|---|---|---|
| V | Offset | ⅛ in. | 1/32 in. |

Figure 5:
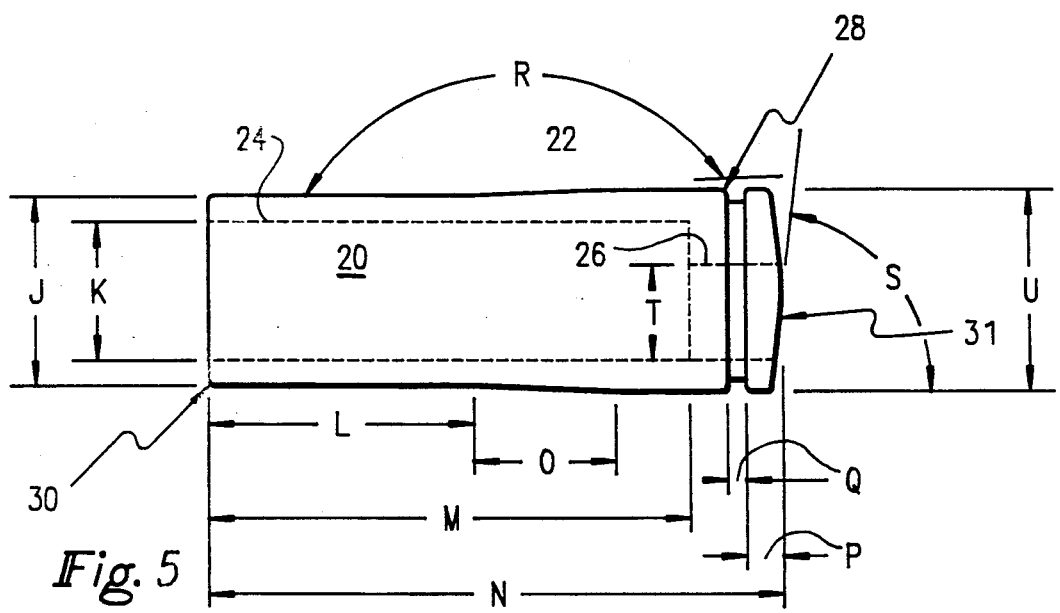
FIG. 5 is a side view of the mouthpiece section of the game caller of the present invention.
Figure 6:
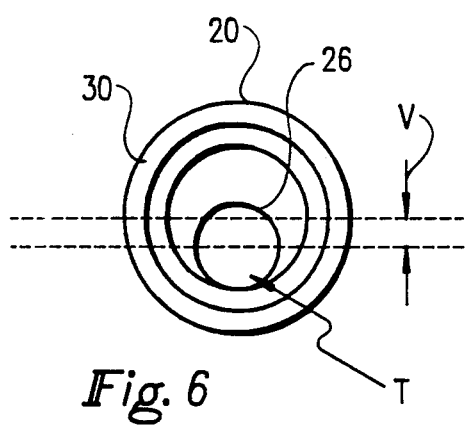
FIG. 6 is a left end view of the mouthpiece section illustrated in FIG. 5.
Figure 7:
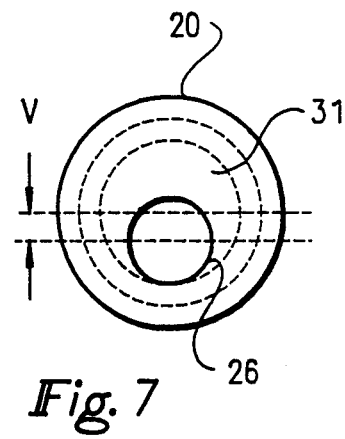
FIG. 7 is a right end view of the mouthpiece section illustrated in FIG. 5.
Figure 8:
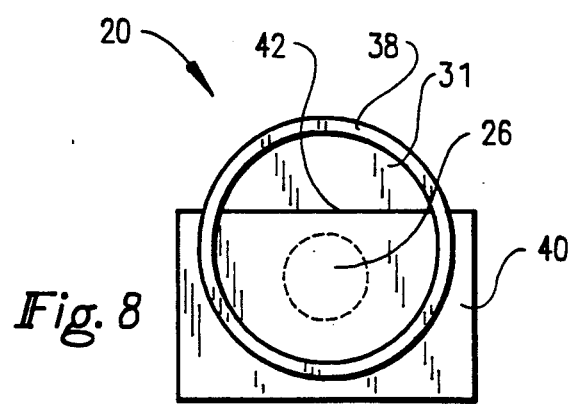
FIG. 8 is a right end view, similar to FIG. 7, illustrating the diaphragm secured over the air outlet aperture of the mouthpiece section by an elastic rubber ring.

FIG. 8 is a right, outlet end view of the mouthpiece section shown in FIG. 5. A small, thin, elastic, latex diaphragm 40 is placed over the conically tapered end face 31, such that the upper edge 42 of the diaphragm 40 is disposed slightly above the upper edge of the sound outlet aperture 26. The disposition of the sound outlet aperture 26 in an offset position from the center of the end face 31, in conjunction with the slight conical taper of the end face 31, causes the outlet aperture to lie in a plane which is inclined with respect to a vertical plane. In other words, the outlet aperture 26 lies in a plane which is not perpendicular to the central longitudinal axis of the bore 24. This creates a relief between the diaphragm 40 and the end face 31, which enhances the sound producing capabilities of the game caller, as contrasted with prior art devices. The latex diaphragm 40 is secured in the adjusted position by stretching an elastic rubber ring 38 over the end of the mouthpiece 20, over the diaphragm 40, and into engagement with the circumferential groove 28 (FIG. 5), to maintain the diaphragm 40 in position. The position and tension of the diaphragm 40 may be adjusted to regulate the sound produced. For example, the upper edge 42 may be positioned closer or farther away from the top edge of the sound outlet aperture 26. The game caller constructed according to the various preferred dimensions listed above is particularly adapted for use as a turkey caller.

The game caller 10 of the present invention may be constructed from a variety of different materials. Preferred materials are a wood such as maple, beech, birch, or ramin for the mouthpiece section 20 and schedule 80 CPVC pipe for the amplifier section. Additionally, it is contemplated that the device may be fabricated from injection molded plastic, metal or a variety of other similar materials. The components of the device are advantageously painted with a camouflage paint scheme to avoid giving away a hunter's position to a game animal.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letter Patent of the United States is as follows:

1. A game caller, comprising:
   a substantially cylindrical tubular mouthpiece section possessing a substantially closed conical end face with an off-center air outlet aperture, said outlet aperture lying in a plane obliquely inclined to a longitudinal axis of said mouthpiece;
   a central longitudinal bore terminating short of said end face and intersecting said air outlet aperture, said air outlet aperture being substantially cylindrical and possessing a sidewall portion partially coextensive with a sidewall of said longitudinal bore, said air outlet aperture possessing a diameter greater than half the diameter of said longitudinal bore;
   a resilient diaphragm disposed at least partially over said end face and said air outlet aperture;
   an elastic ring disposed at least partially over said diaphragm and received in a groove formed around said mouthpiece, such that said diaphragm is pinched between said ring and said mouthpiece, whereby tension and position of said diaphragm may be readily adjusted to regulate sound produced by said game caller;
   a substantially cylindrical tubular amplifier, said mouthpiece disposed in inter-fitting telescopic relation within said amplifier;
   said mouthpiece and said amplifier including cooperating tapered portions such that said mouthpiece and said amplifier are frictionally retained in said inter-fitting relation, said mouthpiece possessing an enlarged diameter cylindrical portion of a predetermined length disposed between said conical end face and said tapered portion of said mouthpiece such that said end face and outlet aperture of said mouthpiece are positioned within said amplifier a distance determined by said predetermined length; and
   said tapered portion of said amplifier being internally reduced in diameter with respect to a diameter of a longitudinal central passage through said amplifier and said tapered portion of said amplifier and said mouthpiece each having a maximum diameter less than said longitudinal passage of said amplifier such that a clearance space separates said mouthpiece from an interior sidewall of said longitudinal passage in said amplifier.

* * * * *